United States Patent [19]

Andoe

[11] Patent Number: 5,336,304
[45] Date of Patent: Aug. 9, 1994

[54] ENVIRONMENTALLY SAFE EPOXY ADHESIVE-COPPER HULL COATING AND METHOD

[75] Inventor: Graham C. Andoe, Ft. Lauderdale, Fla.

[73] Assignee: Cresco, Inc., SA., St. John's, Antigua

[21] Appl. No.: 920,927

[22] Filed: Jul. 28, 1992

[51] Int. Cl.$^5$ ................................................ C09D 5/16
[52] U.S. Cl. ........................... 106/18.32; 106/15.05; 424/78.09; 514/499; 514/500; 523/122; 524/434
[58] Field of Search ............... 106/15.05, 18.32, 18.33, 106/18.35, 18.36; 424/78.09; 514/499, 500; 524/434, 435; 523/122

[56] References Cited

U.S. PATENT DOCUMENTS

| | | | |
|---|---|---|---|
| 3,761,334 | 9/1973 | Zondek | 156/71 |
| 4,115,130 | 9/1978 | Crump et al. | 106/18.33 |
| 4,410,363 | 10/1983 | Supcoe et al. | 106/18.32 |
| 4,468,310 | 8/1984 | Sabins | 204/197 |
| 4,496,444 | 1/1985 | Bagnulo | 204/148 |
| 4,621,112 | 11/1986 | Backhouse et al. | 106/404 |
| 4,639,385 | 1/1987 | Jolitz et al. | 427/386 |
| 4,772,344 | 9/1988 | Andoe | 156/64 |
| 4,806,432 | 2/1989 | Eguchi et al. | 428/457 |
| 4,828,771 | 5/1989 | Kishima et al. | 264/41 |
| 4,908,275 | 3/1990 | Tsuji et al. | 428/457 |
| 4,937,274 | 6/1990 | Arima et al. | 106/480 |
| 5,035,759 | 7/1991 | Andoe | 156/64 |
| 5,044,293 | 9/1991 | Andoe | 156/71 |
| 5,106,525 | 4/1992 | Sullivan | 252/162 |
| 5,173,110 | 12/1992 | Stovicek | 106/18.32 |

Primary Examiner—Anthony Green
Attorney, Agent, or Firm—H. Jay Spiegel

[57] ABSTRACT

The present invention describes in detail new environmentally safe marine vessel hull coating formulations for all outer surfaces of all marine vessel surfaces specifically designed to fully comply with all existing and anticipated environmental regulations. These formulations absolutely prevent water ingress, galvanic corrosion, wood decay, worm ingress, flex to accommodate to hull motions and protect against impact damages and may last for 20 years of the economic life of the marine vessel. These inventive formulations embody specific encapsulation techniques that allow aluminum and large steel hulls to now use these advanced coating products since they do not contain any toxins or co-toxins thereby eliminating the concern about the existing TBT exemptions. The specific materials which are applied to the marine vessel hulls are specified and include an epoxy adhesive resin mixed with copper powder and a thixotropic agent to cause the coating to maintain its shape and configuration while curing. Their mixing procedures, mixing ratios, storage procedures, packaging procedures, shipping procedures, application procedures and maintenance procedures are also fully disclosed in detail. Also disclosed are the specific formulation variables to adapt the products to meet a wide range of end user specifications.

10 Claims, No Drawings

ENVIRONMENTALLY SAFE EPOXY ADHESIVE-COPPER HULL COATING AND METHOD

BACKGROUND OF THE INVENTION

The early work of Woolsey was an improvement upon the ancient art of coating marine vessels with pitch and pepper in an early documented attempt to prevent wooden hulls from being eaten or rotting. Woolsey and others came upon the idea of cheap, yet dangerous, cuprous-oxide, an established toxin, to mix with a binding agent of very low holding power. A small update of that product was developed by Scott Bader of England who modified the Woolsey technology to change the binding agent to polyester resin. This polyester resin base anti-foulant contained styrene in environmentally unacceptable levels. In addition, polyester resin has proven itself to be the major cause of water ingress damage to fiberglass and fiberglass composite hulls such as osmotic blistering. The polyester resin systems also allow quick water permeation into steel and aluminum hull surfaces causing significant hull profile changes from water induced corrosion and rusting. Osmotic blistering is identified by all marine experts as the single most expensive repair cost on a fiberglass hull. Once that "osmosis" has set in and repairs are made, the likelihood of the recurrence of this "boat pox" is very high.

Polyester resin exposure causes extensive damage of a serious and permanent nature to those exposed to the fumes of the thinning or reducing agent, styrene. In another aspect, the polyester resin, which may be used as the binder in the hull construction lay up procedure or in the outer hull coating, has been found to require resin-hardener ratio changes of a very frequent nature depending upon ambient conditions. The catalyzer (MEKP) ratio should be changed with every five degrees change in ambient temperature and must be adjusted for humidity changes as well. For example, in Miami where open boat hull lay ups are done, the current temperature changes are: low temperature 73 degrees Fahrenheit in the morning and, at 2:30 p.m., 93 degrees. Since the temperature will change 20 degrees on a typical summer day, the catalyzer (MEKP) ratio must be changed no less than four times for temperature effects.

In addition, the humidity also exerts a significant detrimental influence upon the strength of polyester resin. For example, as the dewpoint changes approximately five points, the catalyzer (MEKP) ratios should be changed. Typical value changes in Florida show a humidity of 90% in the morning and approximately 50% in the afternoon. Using the same 5 point differential change requirement, the result is eight changes in resin formulations for humidity changes combined with the four temperature caused reformulations for a total of twelve changes in a typical day.

Understanding the difficulties with polyester resin from environmental and practical standpoints, Applicant set out to develop a hull coating which would render a hull impervious to water incursion, would be safe to apply, would prevent attachment by marine organisms and which would be environmentally safe.

In developing the present invention, after a great deal of research, two general resins categories were focused upon: an epoxy modified polyester called vinyl ester and epoxy adhesive itself. Because of short shelf life concerns for vinyl ester, the Applicant selected epoxy adhesive and set to work selecting additional candidates most likely to succeed as a hull coating. The selection was narrowed to the Araldite 106/103 adhesive family produced by Ciba-Geigy. The solid ingredients were metallic copper powder/flakes and a water insoluble thixotropic agent added to cause the coating to keep its configuration while curing on a hull.

While it is known to employ thixotropic agents to maintain gelcoat shape while curing, Applicant is unaware of the use of water insoluble thixotropic agents. In fact, on page 65 of the February/March, 1992 issue of Professional Boatbuilder Magazine, Technical Editor, Bruce Pfund, cites the use of water soluble thixotropic agents as a culprit in the formation of osmotic hull blistering. Applicant has, therefore, employed, solely, water insoluble thixotropic agents.

Numerous immersion tests were done all of which proved satisfactory. Under supervised laboratory conditions, immersion tests were started using the Applicant's formulations using Araldite 103/106 adhesive. Immersion tests were done on clear plastic coupons immersed in distilled water, a highly penetrating fluid. Unacceptable levels of water penetration were found on all other types of epoxy binders.

The following prior art is known to Applicant:
U.S. Pat. No. 3,761,334 to Zondek
U.S. Pat. No. 4,468,310 to Sabins
U.S. Pat. No. 4,496,444 to Bagnulo
U.S. Pat. No. 4,772,344 to Andoe
U.S. Pat. No. 4,806,432 to Eguchi et al.
U.S. Pat. No. 4,908,275 to Tsuji et al.

None of these references teaches or suggests the inventive hull coating and method. Zondek suggests use of an epoxy paint under a metal foil. This in no way teaches or suggests the present invention. Sabins teaches an aluminum marine anode designed to prevent hull corrosion. Bagnulo teaches a method of corrosion protection including a strip or band of aluminum, zinc, magnesium or alloys thereof which is mounted on a metallic structure through the use of an electrically conductive adhesive. The present invention differs from the teachings of Bagnulo as contemplating an epoxy adhesive resin mixed with particles and/or flakes of copper as well as a thixotropic substance and coated on a hull surface.

Andoe discloses a method of protecting the hulls of marine vessels from fouling. Andoe discloses an edge sealant designed to be used as an adhesive to seal a metallic foil to a hull. While Andoe contemplates an adhesive such as vinyl ester, epoxy, silicone, polysulfides or other waterproof adhesives mixed with powdered, milled, chipped or ground copper, copper/nickel or cuprous oxide, Andoe fails to teach or suggest utilizing an epoxy adhesive resin based hull coating including, mixed therein, both copper particles and a thixotropic agent. The Andoe patent fails to recognize the advantages of the present invention.

Eguchi et al. teach a copper/foiled laminated sheet for flexible printed circuit board. This patent is believed to be of only general interest concerning the teachings of the present invention.

Tsuji et al. teach a film carrier and method of manufacturing same including a resin based film and rolled copper foil laminated thereon. Of course, Tsuji et al. fail to contemplate coating of a boat hull with an epoxy adhesive based resin mixed with copper particles and a thixotropic agent.

Applicant is also patentee in U.S. Pat. No. 5,035,759 issued Jul. 30, 1991 and U.S. Pat. No. 5,044,293 issued Sep. 3, 1991. This application has been filed within one year of the respective dates of issuance of these patents.

SUMMARY OF THE INVENTION

The present invention relates to environmentally safe epoxy adhesive-copper hull coatings and method of applying. The present invention includes the following aspects and features:

(A) In a first aspect, the inventive formulation is specifically intended to set a new high standard for OSEA compliance in that it is greater than 99% total solids and does not contain any volatile organic compounds. The formulations contain an extremely high concentration of non-water permeable, non-water soluble ingredients, up to 99% by volume, to prevent osmotic blistering on fiberglass hulls which have inherent tendencies to absorb water. Since the outer surfaces of all marine vessels move while the vessel is being lifted into or out of the water and the surfaces do move a considerable distance with a significant displacement from their original location caused by a combined resultant of forces generated by a combination of vessel speed, wave impacts, vessel lifting, weight and balance considerations, elasticity of the hull and other forces, and since the formulations contain a uniquely high concentration of totally impermeable solids, and since the binding mechanism comprises a highly flexible adhesive of a permanently waterproof nature with extremely high tensile and lap shear strengths with a correspondingly high surface hardness, the inventive coatings protect a hull surface while maintaining their integrity.

(B) In another aspect, the water barrier coating does not allow any water to pass through it. All fiberglass hulls are ultimately permeable membranes which allow an osmotic water ingress into the hull. This water transfer results in a high water content within the laminate layers of a fiberglass hull. This documented water ingress then starts to dissolve any water soluble materials which then force any improperly catalyzed resin-hardener catalyzed products to come together under hydrostatic pressure. This pressure then continues to exert increasing pressures on both the water soluble and the uncatalyzed or improperly catalyzed products forcing them to come together with other products of a similar nature into a narrow stream. When enough such materials come together, typically after three years or more of water immersion service, the narrow stream has more external water pressure applied to it forcing the "goo" into a concentrated bulging pocket on the outer or inner surface of the fiberglass or composite hull. As time increases, the "goo" pocket expands into a blister. However, since natural forces must be balanced, as the decomposing/uncatalyzed products exit the interior of the marine vessels' interior laminate structure, water is drawn into the hull at an increasing rate. Up to 4,000 pounds of water has been found within the laminates of a hull through this process. When a vessel is hauled for the typical maintenance schedule of replacing zincs, checking the props, cleaning the hull, etc., open weeping sores will be noted on the hulls made by the most prestigious manufacturers. These sores are called by many names including "boat pox", blisters, osmotic blisters, and in some cases, result in major structural failures.

(C) In another aspect, it has been well established that the outer surfaces of a marine vessel must be smooth to increase fuel economy, increase nautical miles per gallon of fuel, increase speed, increase engine life while simultaneously decreasing fuel tank sizes and fuel carried as dead weight, design horsepower or repower requirements—in short, causing major cost savings during the construction and life cycle of the subject marine vessel. The inventive formulation, as compared to the rough surfaces of known hull coatings, is quite smooth.

(D) In another aspect, the inventive formulation is designed to last for the "economic life", an established marine criterion, on the outer surfaces of a marine vessel. This criterion requires that these specific formulations remain attached, do not dissolve, do not require regular recoatings, scrubbings, burnishings, sandings or any and all other such in-water or yard based processes. In fact, The Clean Water Act, just placed into effect in California, will be the national role model in 1992 with total national compliance expected. What this means to the owner of a marine vessel is specifically that in-water cleanings and scrubbings are banned because the EPA has determined that cleaning processes remove toxins from the outer surfaces of marine vessels and place them into the surrounding waters. It must be noted that the majority of hull coating manufacturers design their products for a typical Florida service life of 12 months or less so that they can sell more of their products. These products are designed to dissolve into the water.

(E) In another specific criterion, environmental safety will be assured if not enhanced if a product is placed in contact with the sea water that is found in a natural condition in sea water. Since elemental copper is found in sea water in a typical concentration of four parts per billion and since the primary intent of these formulations is to stop water ingress, through this formulation, the Applicant specifies pure metallic copper to meet the criteria of non-permeability and of being found in a natural state in sea water. In its natural state, elemental copper is used as a safe conduit for the greatest majority of domestic water supplies and is used in food and beverage preparation equipment.

(F) In another aspect, the inventive hull coatings are hard enough to withstand regular hard impacts caused by ever increasing water borne debris and poor operational procedures such as running aground. The inventive formulations meet the minimum criteria of no less than 220 days use per year for no less than 20 years at a typical speed of 30 knots. The coating will not wear away as typical paints now do.

(G) In another aspect, the inventive product totally encapsulates the metallic water barrier materials in such a dielectric manner so that there is no contact or potential contact between any and all surfaces of different galvanic potentials or compositions.

(H) In another aspect, the inventive coating is run and sag free when applied to vertical, angled or overhead marine surfaces. Since the weight of the water barrier materials is significant, a non-water soluble thixotropic agent is added to the formulations to allow the coating to remain in place while cross linking occurs. The additional function of the thixotropic agent is to allow the outer surfaces of the coating to level out without the need for chemical flatteners or "fish eye" preventers. The thixotropic agent also resists water ingress, is non-conductive and is environmentally safe.

(I) In another aspect, the inventive coating is specified to be easily repairable in water because boat yards are decreasing in number with a resultant increase in their fees. The repair materials are compatible with epoxy adhesive and salt water and also meet the spirit, intent and specification of all environmental regulations while simultaneously bonding to and functioning with the undamaged hull coating.

(J) The inventive formulations are adaptable to existing surface primers so that there is no adverse interaction between the primer and the inventive formulation.

(K) The inventive formulations have an additional set of physical characteristics such as practical pot life, quick tack times and a 24 hour cure time at 70 degrees Fahrenheit.

As such, it is a first object of the present invention to provide an environmentally safe epoxy adhesive-copper hull coating and method.

It is a further object of the present invention to provide such an invention including the use of a water insoluble thixotropic agent to prevent sagging while the coating is curing.

It is a still further object of the present invention to provide such a coating which may be applied to a hull in a plurality of sequential coats.

It is a yet further object of the present invention to provide such a coating in two embodiments, one of which employs Ciba-Geigy Araldite 106 adhesive resin and the other of which employs Ciba-Geigy Araldite 103 adhesive resin.

These and other objects, aspects and features of the present invention will be better understood from the following detailed description of the preferred embodiments.

SPECIFIC DESCRIPTION OF THE PREFERRED EMBODIMENTS

The inventive coating is disclosed in two preferred embodiments. In a first embodiment, the coating is optimally made up of, by volume:

20% Ciba-Geigy Araldite 106 adhesive resin
20% Ciba-Geigy Araldite 953 adhesive hardener
20% metallic copper in powder/particle form
20% methyl ethylene ketone thinning agent, and
20% water insoluble thixotropic agent.

In a second embodiment, the 106 adhesive resin is replaced with 103 adhesive resin and due to the low viscosity characteristics of the 103 adhesive resin, the thinning agent is eliminated and the hardener proportion is halved. In this embodiment, the constituent ingredients are, optimally, by volume:

2/7 103 adhesive resin
1/7 991 adhesive hardener
2/7 metallic copper
2/7 water insoluble thixotropic agent.

The above listed proportions for the two embodiments of the inventive formulation comprise the optimal proportions. Of course, the inventive formulations are not limited to these proportions and are still effective within prescribed ranges of proportions as follows:

| By Volume | 106 Resin Formulation | By Volume | 103 Resin Formulation |
|---|---|---|---|
| 20–60% | Copper Flakes/Powder | 20–60% | Copper Flakes/Powder |
| 5–30% | Thixotropic Agent (Microballoons) | 5–30% | Thixotropic Agent (Microballoons) |
| 5–20% | Thinner - methyl ethylene ketone or isopropyl alcohol | 20–30% | 103 Adhesive Resin |
| 20–30% | 106 Adhesive Resin | 50% of Resin Proportion | 991 Adhesive Hardener |
| Same as Resin Proportion | 953 Adhesive Hardener | | |

The Ciba-Geigy Araldite 106 adhesive resin is water insoluble and comprises a mixture of fumed silica, Di-N-Butyl Phtalate, Para-Tertiary Butyl-Phenyl Glycidyl Ether and Diglycidyl Ether of Bisphenol A. The Ciba-Geigy Araldite 953 adhesive hardener comprises a mixture of (N,N)-Dinethyl-Dipropyltriamine and Polyamide. The Ciba-Geigy Araldite 103 adhesive resin is water insoluble and comprises a mixture of Di-N-Butyl Phtalate and Diglycidyl Ether of Bisphenol A. The Ciba-Geigy Araldite 991 adhesive hardener comprises a mixture of Triethylene Tetramine, 2, 4, 6-Tris (Dimethylaminomethyl) Phenol, 2, 4, 6-Tris (Dimethylaminomethyl) Phenol and Polyamide.

Concerning the 106 adhesive resin formulation, the thinner which is specified comprises either methyl ethylene ketone or isopropyl alcohol. Methyl ethylene ketone comprises a volatile organic compound, as such, isopropyl alcohol is preferred. In a further aspect, where the 106 adhesive resin formulation is to be applied through rolling or brushing application, the thinner is not necessary. It is only where the 106 adhesive resin formulation is to be used in spraying application that the thinner is necessary to thin the formulation sufficiently to allow spraying. However, under such circumstances, the 103 adhesive resin formulation may be used, without thinner, for spraying operations and, as such, is the preferred formulation for spraying. Of course, the 103 adhesive resin formulation may also be applied through rolling and brushing techniques.

In another aspect, the 106 adhesive resin is a stock material which is commonly available. By contrast, the 103 adhesive resin must be custom ordered and manufactured by the manufacturer. As such, while the 103 adhesive resin formulation has the advantage of applicability using spraying application without the need for a thinner, the disadvantage lies in the need for custom ordering.

The physical data for copper is as follows:

| Appearance and Odor: | Reddish color, Odorless |
|---|---|
| Specific gravity (H20 = 1): | 8.92 |
| Water solubility: | INSOLUBLE |
| Melting point: | 1982 degrees Fahrenheit |
| % volatile by volume: | 0% |
| Molecular weight: | 63.5 |

The water insoluble thixotropic agent, used in the applied products, is preferably Amorphous Silicone Dioxide. It is not a Crystalline form of Silica. The product is known further by the following trade names: Aerosil, Amorphous Fumed Silica, Aerosol 90, 130, 150, 200, 300, 325, 380, OX50, 130VS, 150VS, 200V, 200VS, 255VS, 300VS, 400VS, MOX170 or MOX80. The chemical formula is $SiO_2$ with the following chemical properties:

| | |
|---|---|
| Melting point: | 1700 degrees Celsius |
| VOLUME in water: | INSOLUBLE |
| PH: | 3.6–4.5 |
| Specific Gravity: | Approximately 2.2 |
| Electrical Conductivity: | None |

The appearance/odor is: white fluffy powder with no odor. Amorphous silica, unlike crystalline silica, is considered biologically benign.

The preferred mixing sequence for either adhesive formulation is to add the proper adhesive resin quantity into a large clean mixing container that will not contaminate the liquid. This quantity is referred to as one part. To this add an equal part of metallic copper and where the 106 adhesive resin is employed, add one part thinning agent where spray application will be employed. Stir very slowly from the bottom up using a known art heavy mixing device that lifts particles upwards and does not entrain any air. No less than three minutes per quart is required as the minimum mixing time. For the roll application product, add one part catalyzer (hardener) slowly and continue blending for another three minutes or until the coloration is homogeneous. Next, the thixotropic agent (one part) is added and blended into the mixture.

Where the 103 adhesive resin is employed, the following sequence is preferred:

1. Place the 103 adhesive resin/amorphous silica (thixotropic agent) mixture into a large, clean mixing container. Allow room for a 20% volumetric expansion.

2. Stir for no less than three minutes per quart.

3. Slowly add the pre-measured copper material and stir until the color is homogeneous.

4. Slowly add the pre-measured 953 adhesive hardener into the mixing container until the mixture is homogeneous or for no less than another four minutes. It is further specified that the mixture be allowed to rest, to allow any air bubbles entrained in the mixture to be released, for no less than two minutes per mixed quart of product and no more than 5 minutes per quart.

The specific impact resistance of the inventive product is no less than a SHORE D Hardness value of 80.

The specific elongation of the inventive formulae is up to 9%.

The maximum service temperature to mix, store or apply the formulae is 140 degrees F.

The specified hull coating thickness loss rate is no more than 1.5 mills per year.

The minimum pot life at 70 degrees F is about 45 minutes.

The mixed viscosity of the adhesive is 3,500 for spray use and 40,000 for heavy brush or roll applications.

The lap shear strength is no less than 2,000 psi for the initial tie coat and 1,000 psi for the fully entrained coats at 80 degrees F.

The Ultimate Tensile strength of the initial tie coat for spray is 6,200 psi at 15 degrees C. and 4,800 psi for the roll or brush coat.

The specific gravity of the spray tie coat components is 1.15 for the resin and 0.93 for a hardener. The specific gravity of the roll tie coat is 1.17 for the resin and 0.92 for the hardener. The resin/hardener ratios and combinations may be altered to tailor the inventive products to and for a specific end use.

A preferred mixing ratio for the inventive spray formulation is preferably: the base 103 adhesive resin—100 parts, the 953 adhesive hardener—50 parts, the water barrier materials (copper)—75 parts, and the thixotropic amorphous silica—up to 25% by volume.

The percentages of deviation within which the inventive formulations remain effective have been fully tested at 20-60% proportion of water barrier material content (copper) and the thixotropic agent (silica) may be altered from 30% to 5% with no serious consequences. Humidity has no effect on the material performance.

Set forth below are the specific limitations and parameters within which the product may be used. Surface preparation is a known art. If a 20 year coating is applied over a prior coating that will only remain attached, for example, one year, there is a potential for 19 uninterrupted years of troubles and expenses. Sound established marine practices must be used which are those set forth by Lloyds of London accredited surveys. In another example, if steel or aluminum hulls are to be coated, the requirement for an initial metallic primer coat is known and well established in the art. It is imperative, however, to set out specifically that the primers used by the persons responsible for that installation must be chemically compatible and in such a surface state that will allow the inventive formulation to be applied over the cured primer.

If the primer cures with an oily surface, the oily surface must be lightly abraded with 120 grit and equivalent abrasives or etches to remove the slick outer surfaces typical of an epoxy outer layer.

The minimum cure time is specified to be, for ultimate cure of the homogeneous coating, 36 hours at 70 degrees F. for either application method.

The minimum tack time between coats is specified to be ninety minutes at 80 degrees F. in shade conditions. Direct sunlight reduces this time by 50%. Coverage has been found to be 200 square feet per gallon in a wet mill thickness of 3 mills for the tie coat and 100 square feet per mixed gallon for the water barrier coats. Total coats are to be no less than four with eight coats giving a 20 year service life.

The preferred minimum temperature of the formulation components is 60 degrees F. There are no maximum temperatures. However, the copper barrier material adds heat transfer within the liquid thereby reducing its pot life. Direct sunlight has the same effect on the installed product and on the material within a container.

Since the insoluble water barrier materials (copper) are heavier than the entraining adhesive, it is specified that the container holding the hull coating must have a continuously operating agitating/mixing device.

For roll applications, the preferred method is to place the dispensing container on top of an air powered continously operating paint shaker. Applicant has found that unless these specific procedures are fully met, the required uniform nature of the applied product will not meet acceptable specifications with respect to content, holding power and water barrier resistance.

For example, the typical siphon feed air gun can only be used in a filtered spray booth. This regulation eliminates the use of that device in an outdoor boat yard environment. High volume low pressure spray application (HVLP) is preferred. Airless equipment for roll and spray applications may be used if the product viscosity is such that maximum delivery air pressure limits are not exceeded.

For roll only application, the short nap high quality rollers of the resin application nature have been tested and found to be consistent and satisfactory in nature.

They are, therefore, specified for the reliable application of the inventive product. Short foam rollers and long fibrous texture types will not work satisfactorily.

For roll only application, it is specified that the container be of disposable or cleanable nature and that the container(s) be handled in full compliance with all pertinent environmental rules and regulations. The same cleaning and disposal procedures are specified for the used roller covers themselves.

For air assisted or air powered application equipment, Applicant specifies that closed cabinet cleaning equipment, recyclable in nature, are to be used to eliminate any VOC releases from the clean up process or where methyl ethyl ketone thinner is employed. The cleaned equipment is specified to be stored in a closed cabinet to prevent cleaning residues from being released into the atmosphere.

Roll or brush application tools are to be cleaned with a water soluble cleaner, also with a primary goal of total environmental safety.

The specific application processes for roll or brush use are: Start with a fully prepared environmental covering for the marine vessel(s) to be coated. In a preferred method, the vessel is to be enclosed within an environmental enclosure such as the Marine Enviro-Shield (TM) or others of a similar nature.

In a preferred method, the inventive coatings are mixed, blended and applied within this enclosure. If the hull's surface has been cleaned, and any osmotic, corrosion or rust damages are repaired, a compatible cleaning fluid environmental in nature, such as isopropyl alcohol must be applied to the hull surfaces to remove all surface contamination. Following this cleaning step, in a preferred method, for steel and aluminum hulls, a compatible primer must then be applied to the hull surfaces. After the primer has fully cured, typically 24 hours, it must be inspected for voids and recoated as necessary. When the primer surfaces are all fully cured, they must be lightly abraded to remove any surface oils or waxes, if any, or to microetch those surfaces for increased bonding strength needs.

When the surfaces meet the specific standards set out above, the inventive formulation is to be mixed as detailed earlier. The specific amount mixed is to be that quantity that can be applied within thirty minutes. If two applications are used, the quantity/time ratio limiting number is 45 minutes. A clear coat is to be thoroughly applied to all surfaces in a wet film thickness of no less than three mills as verified by a wet film gauge. This clear coat is also called a tie coat because this method applies a very strong flexible waterproof high strength epoxy adhesive directly onto the prepared marine vessel surfaces as a means to chemically link all subsequent coats to the substrate. For large marine vessels of 100 feet length overall or large interior pipings for power plants, it is specified that if the tie coat application is not complete after one hour and thirty minutes (the application crosslinking window), tie coat application should stop at that point and place so that recoatings may begin.

It is specified in the preferred method that the above crosslinking time window be decreased slightly for existing ambient temperature above 85 degrees F. and increased below 65 degrees F. If cold temperatures are prevalent, Applicant has had successful test applications by storing the inventive coatings at 70 degrees F.

Since the applicator's skill is a variable, it is suggested that subsequent water barrier coats be applied in such a manner that produces a total wet mill thickness of 21 mills or seven three mill coats that are all chemically crosslinked together into one homogeneous tough waterproof surface. Because the inventive product has a characteristic of curing with a slippery surface when the crosslinking time window has passed, and since the slippery surface must be abraded then wiped free of surface contamination, if any, and all subsequent layers are to be applied thereto, significant time and material cost savings result if the inventive crosslinking time window is used in all applications to prevent the underlying layers from excessive crosslinking which will prevent secure bonding between said layers.

The thixotropic consistency of the product and the surface angles combine to form the coating thickness limits for any and all types of application methods. For example, Applicant has done numerous successful 25+ mill thick coatings to wet concrete surfaces that were just removed from a total immersion and were actually running with water. There were no sags, no runs and the ultimate surface was hydro-dynamically very smooth and securely attached. The typical viscosity of the "tie" coat product is 45,000 cps at 77 degrees F. for roll or brush purposes and 10% of that number for spray applications. The viscosity of the inventive coatings is determined by means of a Zahn #2 cup.

For overhead applications, test results show that a wet film thickness of 3 mills is the optimum per layer thickness. Since the "how to" brush, spray, roll application methods are well known, the Applicant states that only the time—thickness—surface angle relationship be observed as stated above. All environmental methods are to be followed explicitly. The last or outermost surface may be treated in one of four methods:

1. The first method for a thinner coating layer of high solids content is to do nothing and allow the water to burnish the surface.

2. The second method is to use a vacuum producing device attached via a secure hose to a surface smoothing tool that uses an abrasive (sanding) open coated material of no less than 120 grit. These tools are specified as the preferred method to reduce the "orange peel" or textured nature of the surfaces.

3. The most preferred method is to apply a total surface layer deposit thickness of greater than 15 mills wet thickness which will allow the inherent nature of the thick coating to become self-smoothing; a surface that needs no further treatment.

4. In a fourth method, the time—thickness—surface angle limits must be carefully observed so that a dry coating of small solid metallic or Teflon particles are deposited upon the outermost coating layer by means of a low pressure, low volume air delivery system of siphon feed or low pressure nature that discharges the particles within a closed structure that is open and at discharge and delivery ends. In a preferred method, a vacuum device draws air through a HEPA filter, through a hose from the above partially closed structure. This assumes that since this process is also done inside the environmental enclosure, airborne discharges, if any, are totally contained. The HEPA filter may be placed in a closed water filled container wherein water pressure and gravity will remove the entrapped particles for recycling purposes.

When the homogeneous surfaces are time cured, which is defined as no less than 36 hours at 70 degrees F., the vessel may be launched using established methods and equipment. The inventive formulation will continue to cure in the water for an additional 30 days.

In a preferred method, the inventive formulations are to be packaged into quart, gallon, five gallon and 55 gallon containers by placing the thixotropic agent into the resin. The water barrier materials (copper) have been found to cause significant coagulation at the bottom of the storage containers. Since material is entrained into the resin for simplicity in mixing, storage or shipping, only the diligence or dedication of a worker will prevent significant quantities of the barrier materials from remaining on or near the bottom of the storage/shipping containers which will result in insufficient water barrier materials being applied to the hulls of marine vessels. Therefore, it is specified that in a preferred method, the water barrier metallic products are premeasured, packaged, stored and shipped separately as component C, component(s) A (adhesive resin and thixotropic agent) and component B (adhesive hardener only). Component C, the water barrier metal powder or flakes, has a separate shipping classification. The containers are specified to be of a sealed metallic nature. The water barrier materials have, in their preferred mixing, shipping and storage method, an indefinite shelf life. If the adhesive resin mixture and the hardener are kept in temperatures below 70 degrees F., shelf life may be expected to be one year or more. It is further specified that the pre-measured correct volumetric quantities be placed into the above shipping and storage containers to eliminate end user mixing ratio errors.

For in-mold method applications, the Applicant notes that since a typical new fiberglass marine vessel lay up (construction) procedure using the inventive products would result in a situation wherein polyester resin hull materials would be placed over the epoxy hull coating within the confines of a female mold, a guaranteed failure would result because polyester resins will not bond to epoxy adhesive resins. Therefore, in the preferred method, Applicant states that an intermediate coating of vinyl ester resin (epoxy modified polyester resin) be applied as the above specified "tie coat" between the inventive epoxy outer surfaces and the polyester boat hull resin using well established lay up schedules and procedures so that no less than a 3 mill wet film intermediate layer is applied therebetween.

A formula may be employed to give a precise measurement of the "wetted" surface area of a marine vessel as follows: divide the beam of the vessel in half then square it; square the draft of the vessel and add it to the ½ beam squared figure; find the square root of the sum of #2 above and multiply it times the overall length of the vessel times 2; then multiply that result by 1.1.

Another improvement in accordance with the teachings of the present invention is the method of applying a coating of greater than 20 mills wet thickness to rough concrete or other surfaces because Applicant has established that in a 25 mill thickness, his inventive formulations become ultra smooth with a final surface finish of a 15 micro inches or less profile. This is a very low drag finish that has a significant advantage to the end user of these products because it is an established fact that as a hull surface profile changes 10 microns, the change in required power or resultant speed is 1%. If one realizes that a new steel hull is about 75 microns profile at launch and quickly becomes 175 microns within two years, the daily fuel penalty for not using this inventive smooth hull coating is several tons of extra fuel used by a typical ship per day!

The top or final coat may have a no resin 99% metallic outer layer air applied within a limited controlled space that uses environmentally safe techniques described below, to contain and recycle any airborne metallic copper particles.

The specific technique is a method wherein an air assisted delivery system removes the desired amount of metallic water barrier particles from the closed container, cup or reservoir. Then these particles are lightly deposited upon the final outer surface. This surface has been found to have a strong affinity for capturing additional barrier materials if the "time window" specified above is adhered to. The actual percentage of water resistant surfaces has been found to reach 95%+ for this final layer. Only flame spray techniques and the inventive sheathing approach this high concentration.

For racing purposes, this final "top dressing" may be changed to inert Teflon. In either case, the final barrier materials are released within a closed device that restricts the release of the final dressing to on the marine vessel surfaces. By means of a low volume vacuum system and HEPA filters, no atmospheric discharges are caused. By means of proper filter mesh selections and cleanings, the solid barrier materials may be recycled.

As such, an invention has been disclosed in terms of products and methods of application which fulfill each and every one of the objects of the invention as set forth hereinabove and provide a new and useful epoxy adhesive-copper hull coating and method of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A coating for covering a hull of a marine vessel and rendering it impervious to water incursion while repelling marine organisms, comprising a mixture of:
   a) 20% to 30%, by volume, of an epoxy adhesive resin comprising a mixture including Diglyidyl Ether of Bisphenol A and Di-N-Butyl Phthalate;
   b) an amount of Polyamide containing hardener sufficient to harden said epoxy adhesive resin;
   c) 20% to 60%, by volume, of a marine organism repelling copper metal in the form of small particles; and
   d) 5% to 30%, by volume, of a water insoluble thixotropic agent;
   said coating being coatable on a marine vessel hull, said coating holding its shape while curing through operation of said thixotropic agent, said coating, in use, rendering a hull impervious to water incursion and repelling marine organisms.

2. The coating of claim 1, wherein said amount of hardener comprises about one half the volume of said adhesive resin.

3. The coating of claim 1, wherein said amount of hardener comprises about the same volume as the volume of said adhesive resin.

4. The coating of claim 1, wherein said thixotropic agent comprises amorphous silica.

5. The coating of claim 1, wherein said coating includes, by volume, 5% to 20% of a thinner.

6. The coating of claim 1, wherein said coating consists of, by volume, 20% adhesive resin, 20% adhesive hardener, 20% thixotropic agent and 20% marine organism repelling metal.

7. The coating of claim 5, wherein said coating consists of, by volume, 20% adhesive resin, 20% adhesive hardener, 20% thixotropic agent and 20% marine organism repelling metal.

8. The coating of claim 7, further including 20%, by volume, of said thinner.

9. The coating of claim 1, wherein said resin is an adhesive, water insoluble epoxy.

10. A coating for covering a hull of a marine vessel and rendering it impervious to water incursion while repelling marine organisms, comprising a mixture of:
   a) 20% to 30%, by volume, of an epoxy adhesive resin;
   b) an amount of Polyamide containing hardener sufficient to harden said epoxy adhesive resin;
   c) 20% to 60%, by volume, of a marine organism repelling copper metal in the form of small particles; and
   d) 5% to 30%, by volume, of a water insoluble thixotropic agent;
   e) said coating including, by volume, 5% to 20% of a thinner;
   said coating being coatable on a marine vessel hull, said coating holding its shape while curing through operation of said thixotropic agent, said coating, in use, rendering a hull impervious to water incursion and repelling marine organisms.

* * * * *